United States Patent [19]

Sakagami et al.

[11] Patent Number: 4,554,335

[45] Date of Patent: Nov. 19, 1985

[54] DIELECTRIC POLYMER MATERIALS

[75] Inventors: Teruo Sakagami; Noriyuki Arakawa; Yoshikichi Teramoto; Kenichi Nakamura, all of Iwaki, Japan

[73] Assignee: Kureha Kagaku Kogyo Kabushiki Kaisha, Tokyo, Japan

[21] Appl. No.: 584,600

[22] Filed: Feb. 29, 1984

Related U.S. Application Data

[63] Continuation of Ser. No. 398,192, Jul. 14, 1982, abandoned, which is a continuation-in-part of Ser. No. 256,839, Apr. 23, 1981, abandoned.

[30] Foreign Application Priority Data

Apr. 28, 1980 [JP] Japan .................................. 55-56817

[51] Int. Cl.$^4$ ........................ C08F 214/22; H01G 4/22
[52] U.S. Cl. .................................... 526/249; 361/317; 428/917; 528/502
[58] Field of Search ......................... 526/249; 528/502

[56] References Cited

U.S. PATENT DOCUMENTS

| | | | |
|---|---|---|---|
| 3,024,224 | 3/1962 | Herbst et al. | 526/249 |
| 3,053,818 | 9/1962 | Honn et al. | 526/249 |
| 4,032,699 | 6/1977 | West | 526/249 |

Primary Examiner—Harry Wong, Jr.
Attorney, Agent, or Firm—Woodcock, Washburn, Kurtz, Mackiewicz & Norris

[57] ABSTRACT

The dielectric polymer materials are composed of about 25 to 90 mol % of vinylidene fluoride, about 5 to 70 mol % of ethylene trifluoride, and about 1 to 13 mol % of ethylene chloride trifluoride. The dielectric polymer materials possess a high dielectric constant and do not vary in dielectric constants with temperatures.

5 Claims, 6 Drawing Figures

DIELECTRIC POLYMER MATERIALS

CROSS-REFERENCE TO RELATED APPLICATION

This is a continuation of application Ser. No. 398,192, filed July 14, 1982, now abandoned, which is a continuation-in-part of application Ser. No. 256,839, filed Apr. 23, 1981, now abandoned.

BACKGROUND OF THE INVENTION

1. Field of the Invention

The present invention relates to a dielectric polymer material which possesses a dielectric constant varying at a high level to a less extend in a wide range of temperatures.

2. Brief Description of the Prior Art

Japanese Patent early Publication No. 69,000/1977 (Patent Publication No. 42,443/1980) discloses dielectric polymer materials which are composed of bipolymers consisting of ethylene trifluoride and vinylidene fluoride and possess a high dielectric constant. The bipolymers, however, have a high dependence of their dielectric constants upon temperature and their dielectric constants may be varied to a great extent with a slight change in usually practically utilizable temperatures ranging from room temperature to 100° C. For example, where the amount of vinylidene fluoride is 55 mol%, the dielectric constant which is about 20 at about 50° C. jumps to a high dielectric constant of about 57 when the temperature is raised to about 85° C. Although temperatures exhibiting maximum dielectric constants vary with compositions of the bipolymers, they have a common characteristic property that the dependence of their dielectric constants upon temperature is great regardless of the compositions of the bipolymers. The high dependence of a dielectric constant upon temperature means that, for example, where a rapid change in temperature is occurred in a capacitor, a rapid change in the function of storing electricity is also caused and that, where a dielectric material is employed as a binder of dispersion electroluminescence or the like, a rapid change in temperature gives rise to a rapid reduction in brightness.

U.S. Pat. No. 3,053,818 to Honn et al. discloses trifluorochloroethylene interpolymers obtainable by interpolymerizing trifluorochloroethylene, vinylidene fluoride and another fluoroolefin including trifluoroethylene. The interpolymers are produced from monomeric mixtures comprising said three components, in which the trifluorochloroethylene and the vinylidene fluoride monomers are each present in an amount of at least 15 mole percent and the other fluoroolefin monomer is present in an amount of at least 5 mole percent. The trifluorochloroethylene interpolymers cannot provide an almost constant dielectric constant over a wide temperature range and a high dielectric constant.

Polyvinylidene fluoride possesses a dielectric constant of about 8 to 16 at room temperature although the dielectric constant may be varied with conditions of orientation of the dielectric material and does not relatively undergo change in temperature. Accordingly, there has been demanded a dielectric material which possesses a higher dielectric constant and does not undergo change in a dielectric constant to a great extent in a wide range of temperatures.

SUMMARY OF THE INVENTION

Accordingly, an object of the present invention is to provide a dielectric polymer material which possesses a property that its dielectric constant does not vary to a great extent in a wide range of temperatures.

Another object of the present invention is to provide a dielectric polymer material which possesses a high dielectric constant.

A further object of the present invention is to provide a dielectric polymer material which has a less dependence of the dielectric constant upon temperature.

DETAILED DESCRIPTION OF THE PREFERRED EMBODIMENTS

Figure 1:
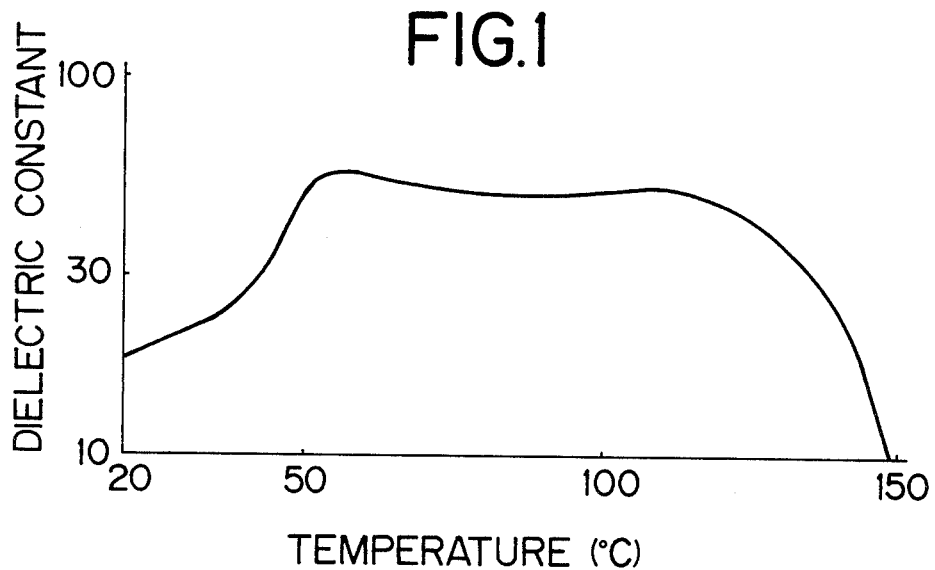
FIGS. 1 to 6, inclusive, are graphs illustrating relationships of dielectric constants of the dielectric materials in accordance with the present invention and the known materials with a variation in temperatures.

The dielectric polymer material in accordance with the present invention comprises vinylidene fluoride, ethylene trifluoride and ethylene chloride trifluoride. An amount of vinylidene fluoride may range from approximately 25 to approximately 90 mol% and, preferably, from approximately 30 to approximately 85 mol%. An amount of ethylene tri-fluoride may range from approximately 5 to approximately 70 mol% and, preferably, from approximately 10 to approximately 65 mol%. An amount of ethylene chloride trifluoride may range from approximately 1 to approximately 13 mol%, preferably, from approximately 2 to approximately 12 mol% and, more preferably, from approximately 3 to approximately 10 mol%. Where amounts of ethylene trifluoride and vinylidene fluoride are outside the above ranges, dielectric constants of the dielectric polymer materials are rendered too low. Where amounts of ethylene chloride trifluoride are beyond the upper limit, dielectric constants of the materials are likewise rendered too low and, where they are smaller than the lower limit, a dependence of dielectric constants of the materials upon temperature is rendered too great.

The dielectric polymer materials in accordance with the present invention may further contain small amounts of one or more of other fluorine-containing monomers such as vinyl fluoride, ethylene tetrafluoride, propylene hexafluoride and so forth.

The copolymers constituting the dielectric polymer materials in accordance with the present invention may be prepared generally by usual polymerization methods which are applicable to polyvinylidene fluoride polymers, such as suspension polymerization, solution polymerization, emulsion polymerization and other suitable methods. The copolymers prepared by the above-mentioned methods are random polymers and they can be prepared easily with a high yield.

The copolymers to be employed for the present invention may be readily dissolved at room temperature or at elevated temperatures in a polar organic solvent such as dimethylformamide, dimethylacetamide, methylethylketone, acetone or the like. The solutions may then be cast readily into films or thermally formed into films or sheets in conventional manner. For example, the copolymers may be formed into sheets by means of a hot press, an extruder a calender or the like. Particularly, where a thin film is desired, the copolymers may be drawn or stretched uniaxially or biaxially by means of a rolling mill or the like.

The dielectric polymer materials in accordance with the present invention may contain the copolymers prepared in the abovementioned manner in an amount of 50% by weight or higher and further contain an additive to be used for other usual dielectric material such as a strongly dielectric ceramic material or a blend thereof.

The present invention will be further described by way of working examples.

EXAMPLE 1

A stainless autoclave equipped with a stirrer was filled with 0.29% aqueous solution of perfluorooctanoic acid in which 70% of its carboxyl groups were converted into sodium salts, as an emulsifying agent. After the solution was cooled to 5° C., hydrogen peroxide as a polymerization initiator and other polymerization acids were added. After the mixture was replaced with $N_2$ and stirred well, the autoclave was cooled from outside by means of a methanol-dry ice system and vinylidene fluoride, ethylene trifluoride and ethylene chloride trifluoride were then pressed into the autoclave from each of the containers so as to amount to 65 mol%, 30 mol% and 5 mol%, respectively. The autoclave was then heated to initiate polymerization and the polymerization reaction was continued while maintaining the outside temperature at 25° C. The initial pressure of polymerization was 32 kg/cm² and the pressure was continuously reduced to 25 kg/cm² for 3 hours and at the final stage to 5 kg/cm². At the final stage, the residual pressure was purged to terminate the polymerization reaction, whereby a favorable emulsion in pale blue was produced. The emulsion was then subject to salting-out with sodium chloride, washed with water well and dried to give a white terpolymer in a form of powder with a yield of 90%. The powdery material was hotpressed at 200° C. to form a film having a thickness of about 150 microns.

The film was found to be a flexible film having a favorable transparency and a melting point of 140° C. when measured by means of DSC. The dielectric constants of the films were measured at 30 $H_z$ by means of a rheolograph (manufacture of Toyo Seiki Kabushiki Kaisha). The results are shown in FIG. 1 from which it is found that the dielectric constant was about 17.8 at 20° C. and about 50 in a range from 50° to 120° C. with a slight variation with temperatures. The dielectric dissipation factor (tan δ) was 0.056.

COMPARATIVE EXAMPLES 1 AND 2

A bipolymer comprising 55 mol% of vinylidene fluoride and 45 mol% of ethylene trifluoride (Comparative Example 1) were measured for its dielectric constants with a variation in temperatures. A curved line A in FIG. 2 indicates that the dielectric constants of the copolymer is dependent greatly upon temperatures and it was found that they varied to a great extent with temperatures.

Figure 2:
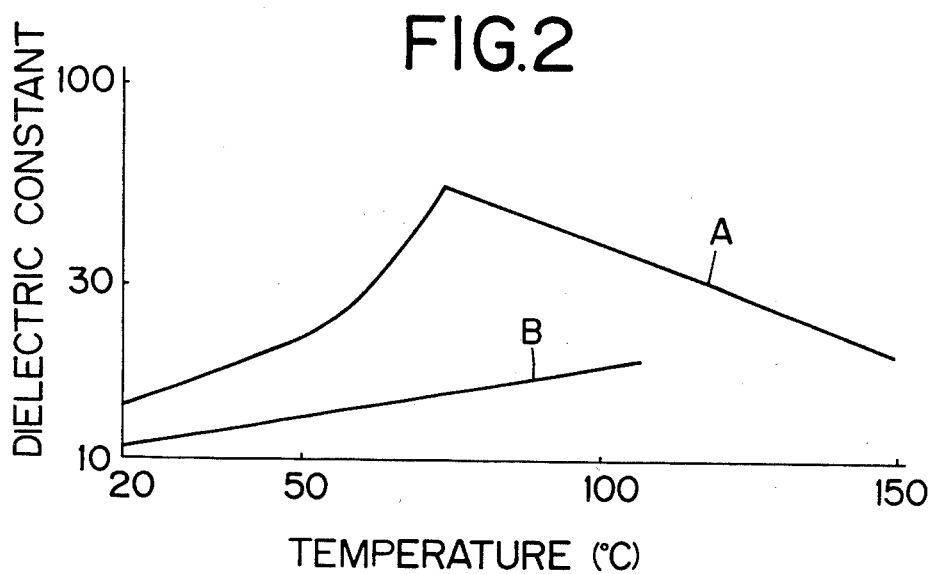

A curved line B in FIG. 2 indicates the dependence of the dielectric constants of polyvinylidene fluoride homopolymer (Comparative Example 2) upon temperature. It was also found that the dielectric constants varied to a great extent with temperatures.

EXAMPLE 2

Figure 3:
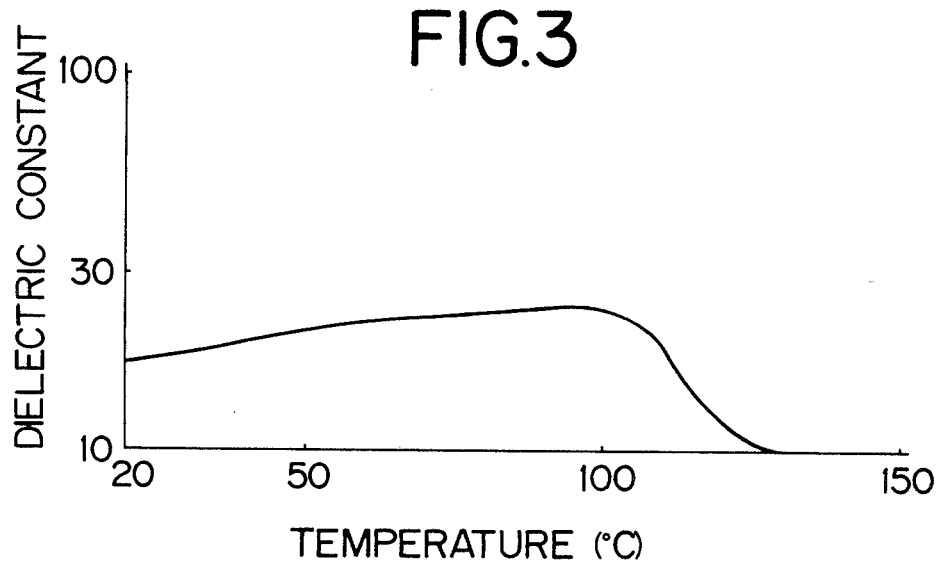

Transparent films were prepared by following the procedure of Example 1, using 75 mol% of vinylidene fluoride, 15 mol% of ethylene trifluoride and 10 mol% of ethylene chloride trifluoride. The dielectric constants of the films were measured at 30 $H_z$ at varying temperatures. The results are shown in FIG. 3 in which the dielectric constants were lower as a whole than those of Example 1, but they did not vary to a great extent with temperatures ranging from room temperature to 100° C.

EXAMPLE 3

Figure 4:
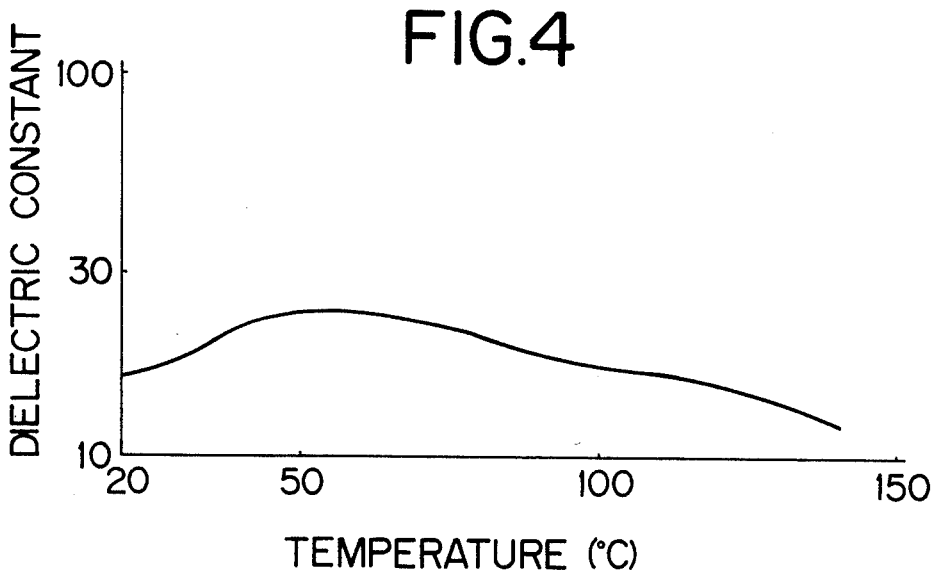

Transparent films were prepared by following the procedure of Example 1, using 50 mol% of vinylidene fluoride, 45 mol% of ethylene trifluoride and 5 mol% of ethylene chloride trifluoride. The resultant terpolymer was measured for the dependence of its dielectric constants upon temperature at 30 $H_z$. The results are shown in FIG. 4 in which it indicated substantially the same dielectric constants in a scope of temperatures lower than 100° C. as in Example 2.

EXAMPLE 4

Figure 5:
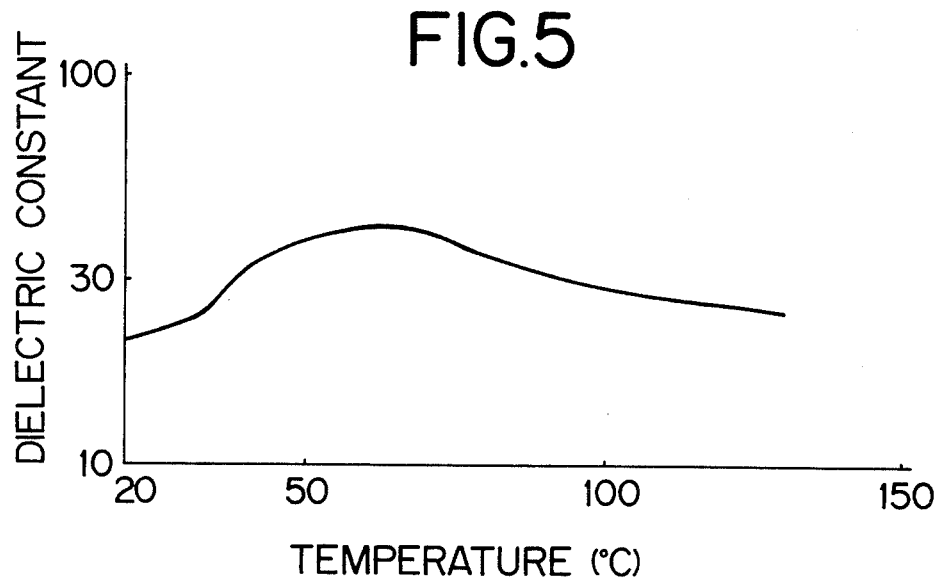

The terpolymer prepared in Example 1 was stretched uniaxially by 4.8 times the original length at 50° C. and its dielectric constants were found to be 22 at 25° C. as illustrated in FIG. 5. When compared with the unstretched film prepared in Example 1, the dielectric constants of this stretched film increased at a temperature range nearly room temperature and decreased at higher temperatures. Accordingly, the dependence of its dielectric constants upon temperature is further improved in this case.

EXAMPLE 5

Figure 6:
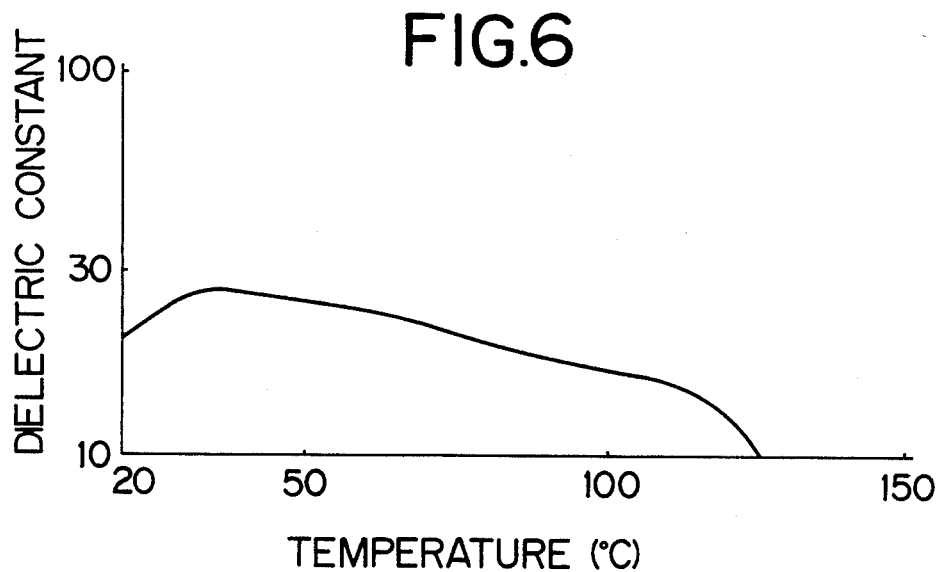

The terpolymers were prepared in the same manner as in Example 1, using 60 mol% of vinylidene fluoride, 30 mol% of ethylene trifluoride and 10 mol% of ethylene chloride trifluoride. Its dielectric constants are shown in FIG. 6.

It may be understood from the above Examples that the dielectric polymer materials in accordance with the present invention possess dielectric constants higher at a scope of temperatures ranging from room temperature to 100° C. than those of polyvinylidene fluoride homopolymer and that the dependence of their dielectric constants upon temperature is smaller than that of vinylidene fluoride-ethylene trifluoride binary copolymer so that they undergo an adverse influence, if any, to a very slight extent; accordingly, they are industrially useful.

What is claimed is:

1. A dielectric polymer material consisting essentially of approximately 25 to approximately 90 mol% of vinylidene fluoride, approximately 5 to approximately 70 mol% of ethylene trifluoride, approximately 3 to approximately 10 mol% of ethylene chloride trifluoride, and up to about 3 mol% of another fluorine-containing monomer said material having a dielectric constant of at least about 20 over at least a fifty celcius degree temperature range between room temperature and 100° C., said material having a difference between maximum and minimum dielectric constant values less than about 13 over said fifty degree range.

2. The dielectric polymer material according to claim 1, wherein vinylidene fluoride is present in an amount of approximately 30 to approximately 85 mol%.

3. The dielectric polymer material according to claim 1, wherein ethylene trifluoride is present in an amount of approximately 10 to approximately 65 mol%.

4. The dielectric polymer material of claim 1 in the form of a sheet or film.

5. The dielectric polymer material according to claim 4 wherein said film has been drawn or stretched.

* * * * *